D. C. WOOD.
Ice-Hooks.

No. 165,778.

Patented July 20, 1875.

Witnesses
Jos. B. Connolly
N. Connolly

Inventor
Daniel C. Woods
By Connolly Bros
Attorneys

UNITED STATES PATENT OFFICE.

DANIEL C. WOOD, OF QUINCY, ILLINOIS.

IMPROVEMENT IN ICE-HOOKS.

Specification forming part of Letters Patent No. 165,778, dated July 20, 1875; application filed April 28, 1875.

*To all whom it may concern:*

Be it known that I, D. C. WOOD, of Quincy, in the county of Adams and State of Illinois, have invented a certain new and useful Improvement in Ice-Hooks; and I do hereby declare the following to be a full, clear, and exact description of the invention, such as will enable others skilled in the art to which it pertains to make and use it, reference being had to the accompanying drawings, which form part of this specification, in which—

Figure 1:
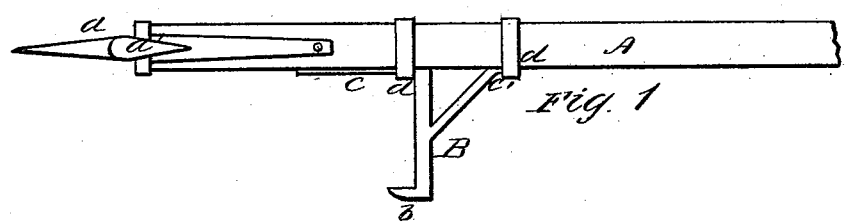
Figure 2:
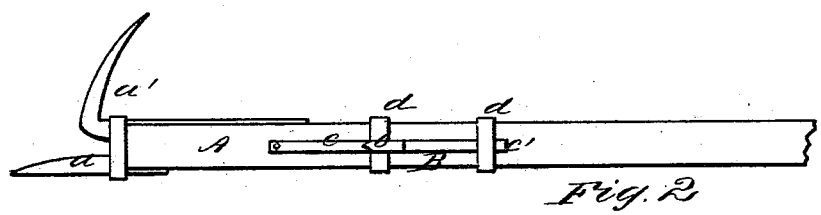

Figures 1 and 2 are side views of my invention.

This invention has relation to implements for handling ice; and it consists in providing the utensil known as an "ice-hook," and comprising a long handle, with one or more tines projecting from its forward end, with a laterally projecting cant-hook, by means of which large blocks of ice may be lifted upon edge, and readily moved to different positions, the handle serving as a lever, while the necessary purchase or hold upon the block is obtained by the sharpened and bent end of the cant-hook.

For the purposes of transportation, as well as for ordinary preservation in ice-houses, cakes of ice are usually set upon edge, to facilitate their subsequent displacement, this arrangement being better for the purpose than the disposal of the cakes in flats.

With the ordinary ice-hook the tilting of heavy cakes is very difficult, as but a slight purchase is obtainable, and as the cakes must be tilted by a pulling motion, which affords very little leverage.

The supplementary hook of my improvement is advantageous in not only allowing a better hold to be obtained upon the block, but in enabling the operator to readily tilt and move the same forward and from him.

Referring to the accompanying drawings, A designates the handle of the implement, which may be of, say, four and a half feet in length, or of any other desirable size. *a a'* are the usual end attachments of an ice-hook. B represents my improvement, consisting of a suitably-shaped laterally-projecting bar, terminating in a hook, *b*, at its outer extremity, pointing toward the forward end of the handle. The inner portion of the bar B is bifurcated, and continued into two arms, *c c'*, which rest against the side of the handle, as shown, or in a suitable longitudinal channel, and are embraced by the bands *d d*, which encircle said handle, and thus securely retain the cant-hook in position.

A screw or rivet may with advantage be inserted in the handle through the end of the arm *c*.

The construction and arrangement of this cant-hook renders it detachable; hence it may be applied to any ordinary ice-hook handle.

I claim—

1. The improved ice-hook, consisting of the handle A, attachments *a a'*, and laterally-projecting cant-hook B, substantially as described.

2. The rigid cant-hook B, having the bifurcated shank and arms *c c'*, in combination with the handle A, having the bands *d d* encircling said arms, as shown and described.

In testimony that I claim the foregoing I have hereunto set my hand this 17th day of April, 1875.

DANIEL C. WOOD.

Witnesses:
ALEXANDER STOBIE,
LEOPOLD STURKAHN.